United States Patent [19]
Higuchi et al.

[11] Patent Number: 5,979,034
[45] Date of Patent: *Nov. 9, 1999

[54] METHOD OF MANUFACTURING A TAPE CARTRIDGE AND APPARATUS FOR FORMING A MARKING HOLE FOR USE IN THE METHOD

[75] Inventors: Shintaro Higuchi; Hiroyuki Honma, both of Miyagi, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/537,860
[22] PCT Filed: May 30, 1995
[86] PCT No.: PCT/JP95/01042
§ 371 Date: Mar. 19, 1996
§ 102(e) Date: Mar. 19, 1996
[87] PCT Pub. No.: WO95/33263
PCT Pub. Date: Dec. 7, 1995
[51] Int. Cl.⁶ .................. B26D 7/06; B26F 1/00
[52] U.S. Cl. .................. 29/407.01; 29/407.05; 29/429; 29/806; 53/118; 53/430; 53/435; 53/520; 83/76.1; 83/685; 83/948; 242/522
[58] Field of Search .................. 83/76.1, 76.6, 83/50, 55, 685, 948; 242/333.2, 525.4, 526.1, 522; 53/118, 430, 435, 520; 29/429, 407.01, 407.05, 806

[56] References Cited

U.S. PATENT DOCUMENTS

| | | |
|---|---|---|
| 2,060,132 | 11/1936 | Sparks .................. 242/525.4 |
| 2,825,406 | 3/1958 | Hagopian .................. 83/685 X |
| 3,470,777 | 10/1969 | Flubacker .................. 83/948 X |
| 3,499,202 | 3/1970 | Napor et al. .................. 53/118 X |
| 3,861,619 | 1/1975 | Wolf . |
| 3,917,184 | 11/1975 | King .................. 242/525.4 X |
| 4,331,049 | 5/1982 | Bergmann et al. .................. 83/76.6 |
| 4,367,588 | 1/1983 | Herbert .................. 83/76.6 X |
| 4,380,943 | 4/1983 | Evans .................. 83/76 X |
| 4,397,532 | 8/1983 | Webb .................. 242/525.4 X |
| 4,430,718 | 2/1984 | Hendren .................. 83/76.6 X |
| 4,982,636 | 1/1991 | Becking .................. 83/948 X |

FOREIGN PATENT DOCUMENTS 7122024  5/1995  Japan .

Primary Examiner—Joseph M. Gorski
Attorney, Agent, or Firm—Jay H. Maioli

[57] ABSTRACT

A method for manufacturing a tape cartridge includes the steps of forming reel shafts, roller shafts, and tape guides, and the like on a base plate, mounting tape reels on the reel shafts and belt guide rollers on the roller shafts, and the like, placing a drive belt on the belt guide rollers, winding a magnetic tape on the tape reels, securing a cover to the base plate, and forming a marking hole for positional identification in the magnetic tape wound on the tape reels. A marking hole forming apparatus for forming the marking hole which is used at the marking hole forming step, includes a tape driving section for transporting the magnetic tape wound on the tape reels, a punching section for forming the marking hole at a predetermined position in the magnetic tape transported by a predetermined amount by the tape driving section, a hole-position detecting section for detecting a position of the marking hole formed by the punching section, and a controller for controlling the tape driving section, the punching section, and the hole-position detecting section.

8 Claims, 14 Drawing Sheets

| HOLE NO. | HOLE POSITION (NUMBER OF MOTOR POSITIONING PULSES) 1 PULSE = 0.1mm | TRANSPORTATION SPEED OF TAPE BETWEEN HOLES (m/s) |
|---|---|---|
| 1 | 3050 | 0.05 |
| 2 | 3105 | 0.05 |
| 3 | 6100 | 0.05 |
| 4 | 6155 | 0.05 |
| 5 | 9150 | 0.05 |
| 6 | 9205 | 0.05 |
| 7 | 19820 | 0.05 |
| 8 | 1238820 | 3.10 |
| 9 | 1249490 | 0.05 |
| ⋮ | ⋮ | ⋮ |

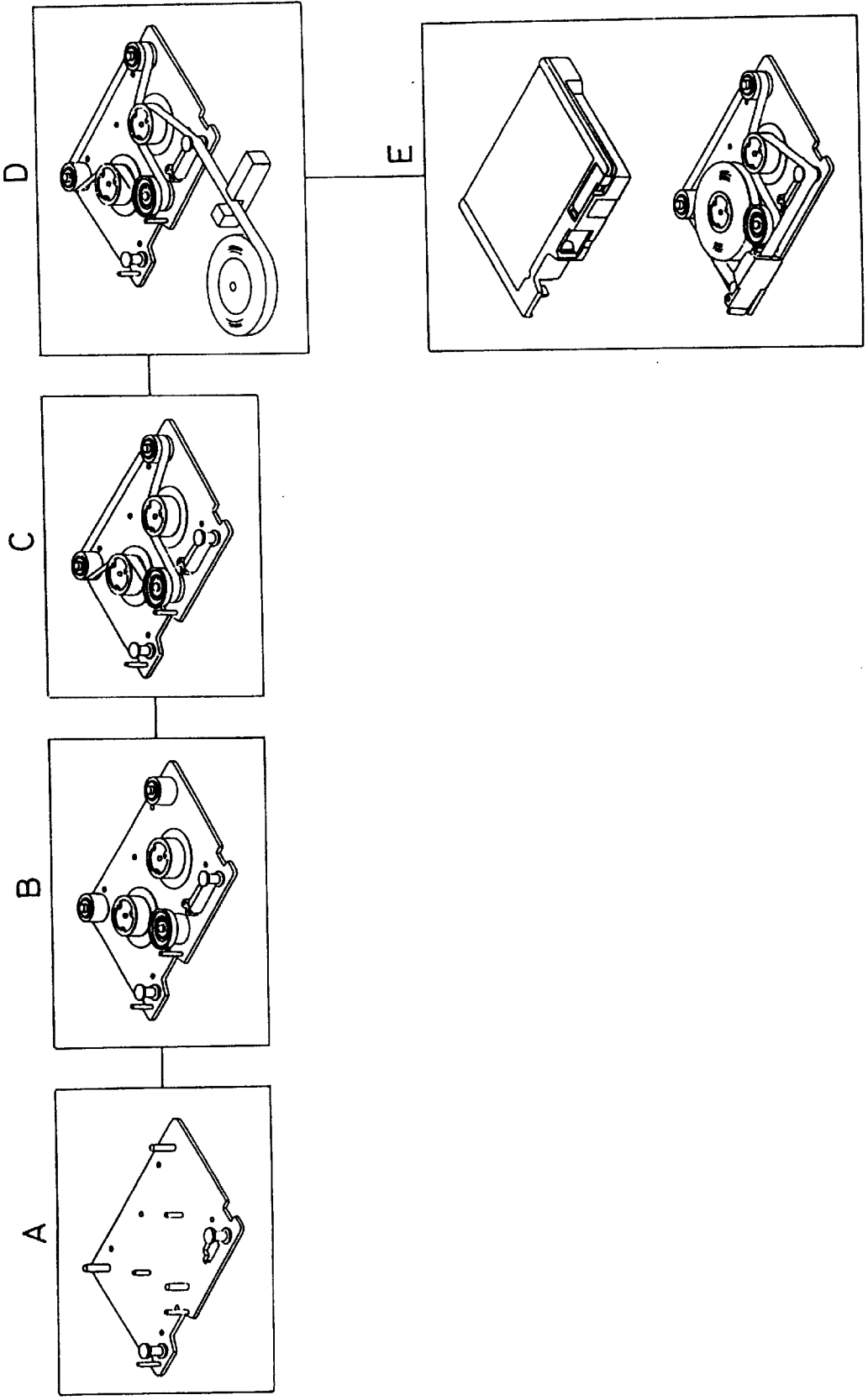

1

METHOD OF MANUFACTURING A TAPE CARTRIDGE AND APPARATUS FOR FORMING A MARKING HOLE FOR USE IN THE METHOD

TECHNICAL FIELD

The present invention relates to a method of manufacturing a tape cartridge or cassette used as an external storage medium and an apparatus for manufacturing the cartridge. Specifically, the invention relates to an apparatus for forming a marking hole in a magnetic tape accommodated in the cartridge which is used for detecting leading and trailing ends of wound or rewound portion of the magnetic tape and distinguishing kind or length of the magnetic tape.

BACKGROUND ART

For example, Japanese Patent Application First Publication No. 2-162586 discloses a tape cartridge used as an external storage medium for a computer. This tape cartridge includes a base plate and a transparent resin cover attached to the base plate.

First and second reel shafts are disposed on the base plate, and first and second tape reels are rotatably supported on the first and second reel shafts.

A magnetic tape is wound on the first and second tape reels.

The magnetic tape is transported along first and second tape guides formed on the base plate, and passes through a head-inserting portion provided on the cover for access to the interior of the cartridge by a magnetic head.

First, second, and third roller shafts are uprightly formed on the base plate. A first belt guide roller (belt driving roller) is rotatably supported on the first roller shaft. Second and third belt guide rollers (corner rollers) are rotatably supported on the second and third roller shafts, respectively.

A drive belt is spanned between and placed around the first, second, and third belt guide rollers. The drive belt is pressingly contacted at its portion extending between the first and second belt guide rollers with an outer surface of the magnetic tape wound around the first tape reel, and pressingly contacted at its portion extending between the first and third belt guide rollers with an outer surface of the magnetic tape wound around the second tape reel.

When the drive belt is rotatingly driven, the first and second tape reels start to rotate due to frictional contact between the drive belt and the magnetic tape, whereby the magnetic tape is transported.

A mirror is so arranged on the base plate as to reflect a detection light emitted from a light emitting source of a drive device and direct the detection light onto the magnetic tape.

The cover is so disposed on the base plate as to cover the first and second tape reels, the magnetic tape, and the like.

The cartridge is used by being inserted into the drive device.

The drive device includes the light emitting source, a first light receiving member (cartridge-in sensor), and a second light receiving member (tape-position sensor).

When the tape cartridge is inserted into the drive device, the detection light emitted from the light emitting source is reflected on the mirror, and therefore it fails to reach the first light receiving member. Thus, it is detected that the tape cartridge is disposed within the drive device.

The detection light reflected on the mirror is oriented to the magnetic tape and the second light receiving member.

On the other hand, when the tape cartridge is inserted into the drive device, a drive capstan roller provided in the drive device is so driven as to come into contact with the first belt guide roller.

When the drive capstan roller is rotated, the first belt guide roller is rotated to thereby move the drive belt by which the magnetic tape is transported.

When the magnetic tape is transported so that a marking hole formed therein moves through a light path of the detection light reflected on the mirror, the detection light reaches the second light receiving member through the marking hole so that a leading or trailing end of a wound or rewound portion of the magnetic tape is detected.

FIG. 16 shows an explanatory diagram indicating a method of manufacturing a tape cartridge which has been previously proposed by an applicant of the present application.

This method comprises the steps of: (A) forming first and second reel shafts, first and second guides, first, second, and third roller shafts, and a lid support shaft on a base plate; (B) mounting first and second tape reels on the first and second reel shafts, respectively, first, second, and third belt guide rollers on the first, second, and third roller shafts, respectively, and a mirror on the base plate; (C) placing a drive belt on the first, second, and third belt guide rollers; (D) winding magnetic tape on the first and second tape reels while forming a marking hole in the magnetic tape, by using a tape winder; and (E) securing a cover to the base plate after mounting a lid on the base plate.

This method of manufacturing the tape cartridge has the following problems because the formation of the marking hole and the winding of the magnetic tape on the tape reels are performed simultaneously at the step (D) described above.

(1) Since a lot of time is required at the step (D), manufacturing efficiency decreases.

It is required a relatively less time at the step (A) of assembling the reel shafts and the like, the step (B) of mounting the tape reels and the like, and the step (C) of placing the drive belt. However, the step (D) of winding the magnetic tape while forming the marking hole necessitates twice or thrice of time required at each of the steps (A) to (C). This causes stick on or accumulation of incomplete cartridges at the step (D) after finishing the steps (A), (B), and (C)

The accumulation can be eliminated by using many tape winders. Nevertheless, this causes an increased cost of equipment.

(2) Since a marking hole is formed in the magnetic tape and then the magnetic tape with the hole is transported to the tape reel to be wound thereon, the magnetic tape has the marking holes over its whole length when the magnetic tape is completed to be wound on the tape reel.

Accordingly, in a case where magnetic tapes have an equivalent length but different patterns of marking holes, it is required to manufacture different kinds of tape cartridges for storing the magnetic tapes with different patterns of marking holes. It is complicated or difficult to classify and store these different kinds of tape cartridges.

In addition, it is impossible to modify one type of tape cartridge for storing a longer length of magnetic tape to another type of tape cartridge for storing a shorter length of magnetic tape.

The present invention contemplates to solve the problems as mentioned above.

DISCLOSURE OF THE INVENTION

There is provided a method of manufacturing a magnetic tape cartridge or cassette, according to the present invention, comprising the steps of:

forming first and second reel shafts and first, second, and third roller shafts on a base plate;

mounting first and second tape reels on the first and second reel shafts, and first, second, and third belt guide rollers on the first, second, and third roller shafts;

disposing a drive belt on the first, second, and third belt guide rollers;

winding a magnetic tape on the first and second tape reels;

securing a cover to the base plate; and forming a marking hole in the magnetic tape wound on the first and second tape reels.

Further, there is provided, for use in the above-mentioned marking hole forming step, an apparatus for forming a marking hole in the magnetic tape wound on the tape reels, according to the present invention, including:

tape driving means for transporting the magnetic tape wound on the tape reels, punching means for forming the marking hole in the magnetic tape transported by a predetermined amount by the tape driving means, at a predetermined position;

hole-position detecting means for detecting a position of the marking hole formed by the punching means; and control means for controlling the tape driving means, the punching means, and the hole-position detecting means.

BRIEF DESCRIPTION OF THE DRAWINGS

FIG. 16 is a block diagram of a method of manufacturing a magnetic tape cartridge which has been previously proposed by the applicant of the present application.

BEST MODE FOR EMBODYING THE INVENTION

Figure 1:
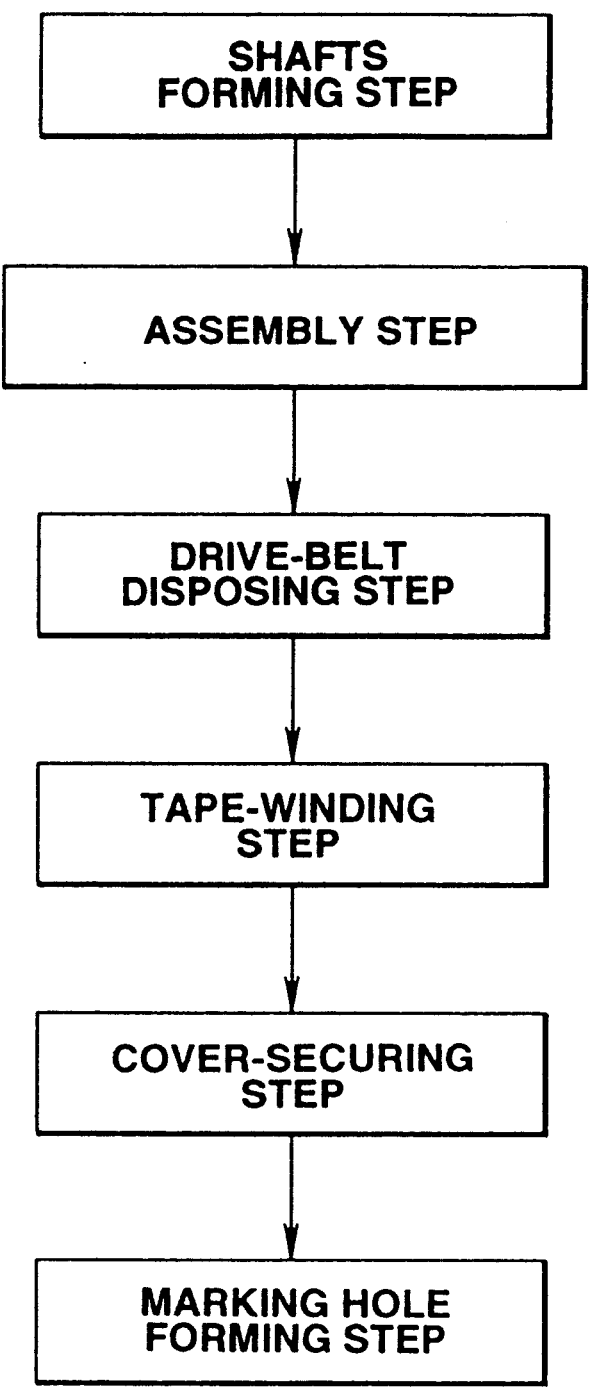
FIG. 1 is a block diagram showing a method of manufacturing a tape cartridge, according to the present invention.

FIG. 1 shows a flow chart of a first embodiment of a method of manufacturing a tape cartridge or cassette, according to the present invention.

The method includes the steps of: (first step) forming reel shafts, roller shafts, and the like on a base plate; (second step) assembling or mounting tape reels on the reel shafts and belt guide rollers on the roller shafts; (third step) placing a drive belt on the belt guide rollers; (fourth step) winding a magnetic tape on the tape reels; (fifth step) securing a cover to the base plate; and (sixth step) forming a marking hole for positional identification in the magnetic tape wound on the tape reels.

Figure 2:
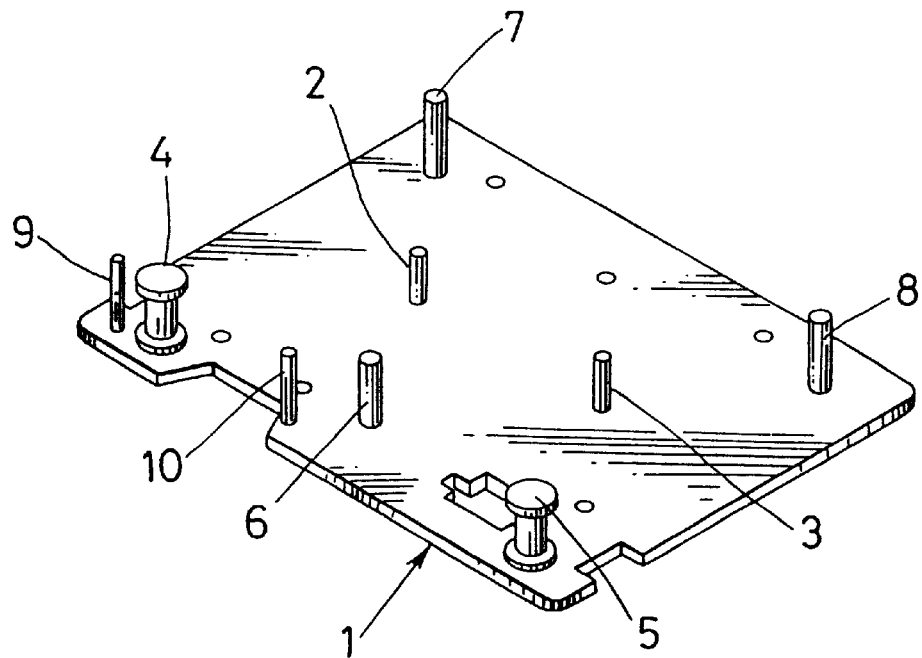
FIG. 2 is a perspective view showing a shafts forming step.

In the shafts forming step as described above, as illustrated in FIG. 2, there are provided, on a base plate 1, first and second reel shafts 2 and 3, first and second tape guides 4 and 5, first, second, and third roller shafts 6, 7, and 8, a lid support shaft 9, and a guide pin 10.

Figure 3:
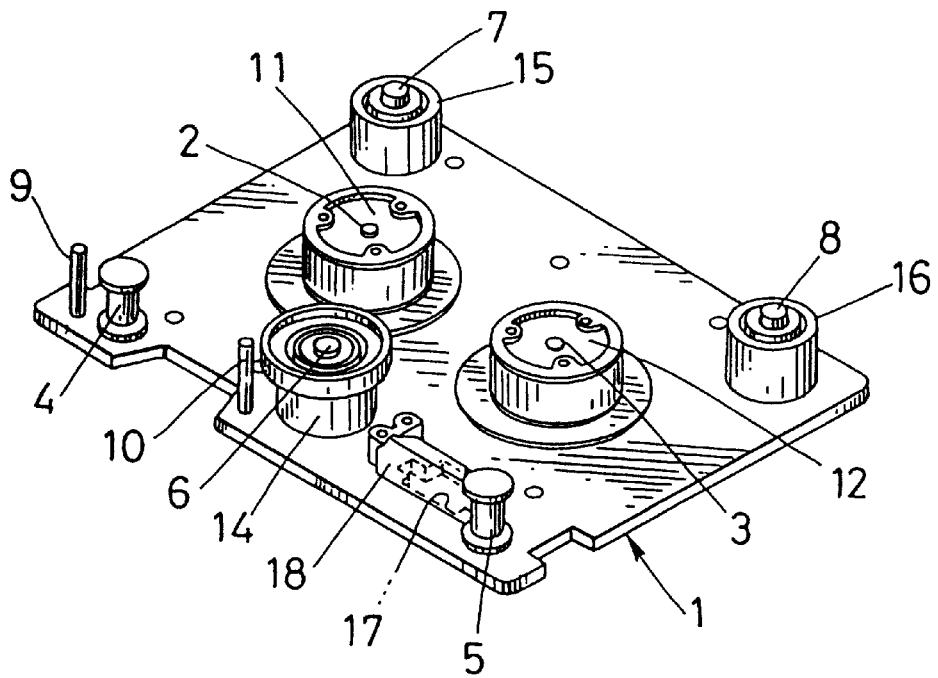
FIG. 3 is a perspective view showing an assembly step.
Figure 4:
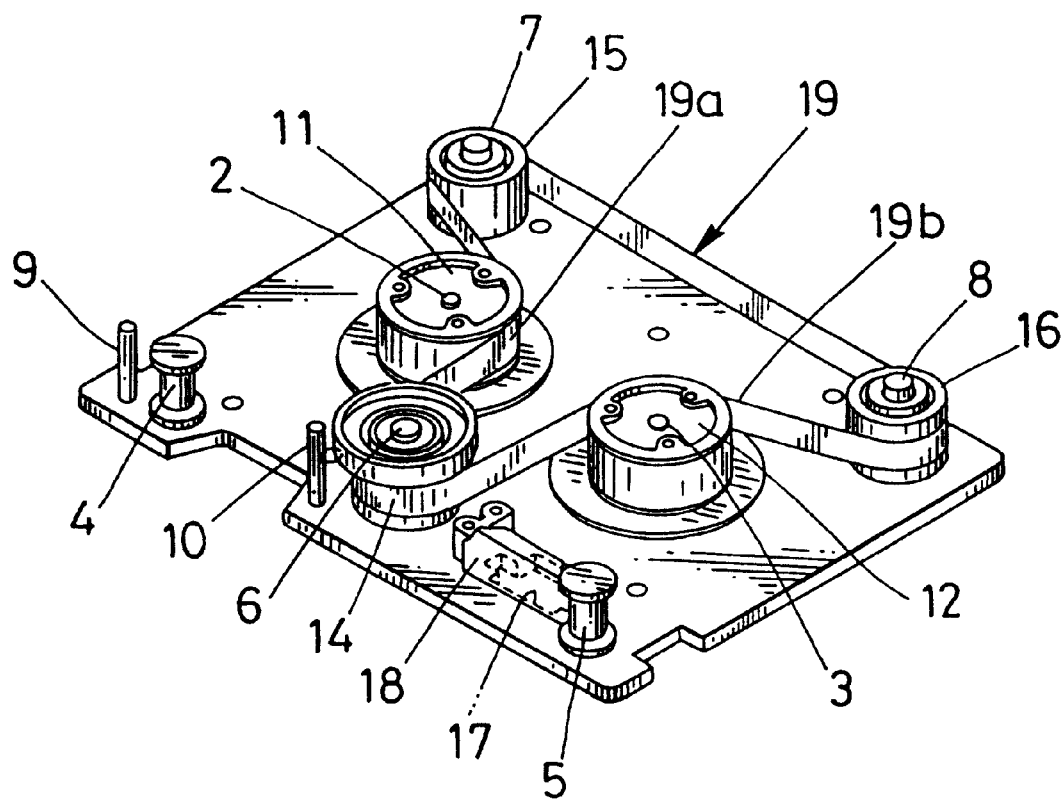
FIG. 4 is a perspective view showing a drive-belt disposing step.

In the assembly step as described above, as illustrated in FIG. 3, first and second tape reels 11 and 12 are mounted on the first and second reel shafts 2 and 3, respectively, and first, second, and third belt guide rollers 14, 15, and 16 are mounted on the first, second, and third roller shafts 6, 7, and 8, respectively. A mirror 18 is so arranged as to be opposed to a detection-light transmitting portion 17 provided on the base plate In the drive-belt disposing step as described above, as illustrated in FIG. 4, a drive belt 19 made of material such as urethane rubber and the like is placed on the first, second, and third belt guide rollers 14, 15, and 16. The drive belt 19 is pressingly contacted at a portion 19a thereof spanning between the first and second belt guide rollers 14 and 15 with an outer peripheral surface of the first tape reel 2, and at a portion 19b thereof spanning between the first and third belt guide rollers 14 and 16 with an outer peripheral surface of the second tape reel 3.

Figure 5:
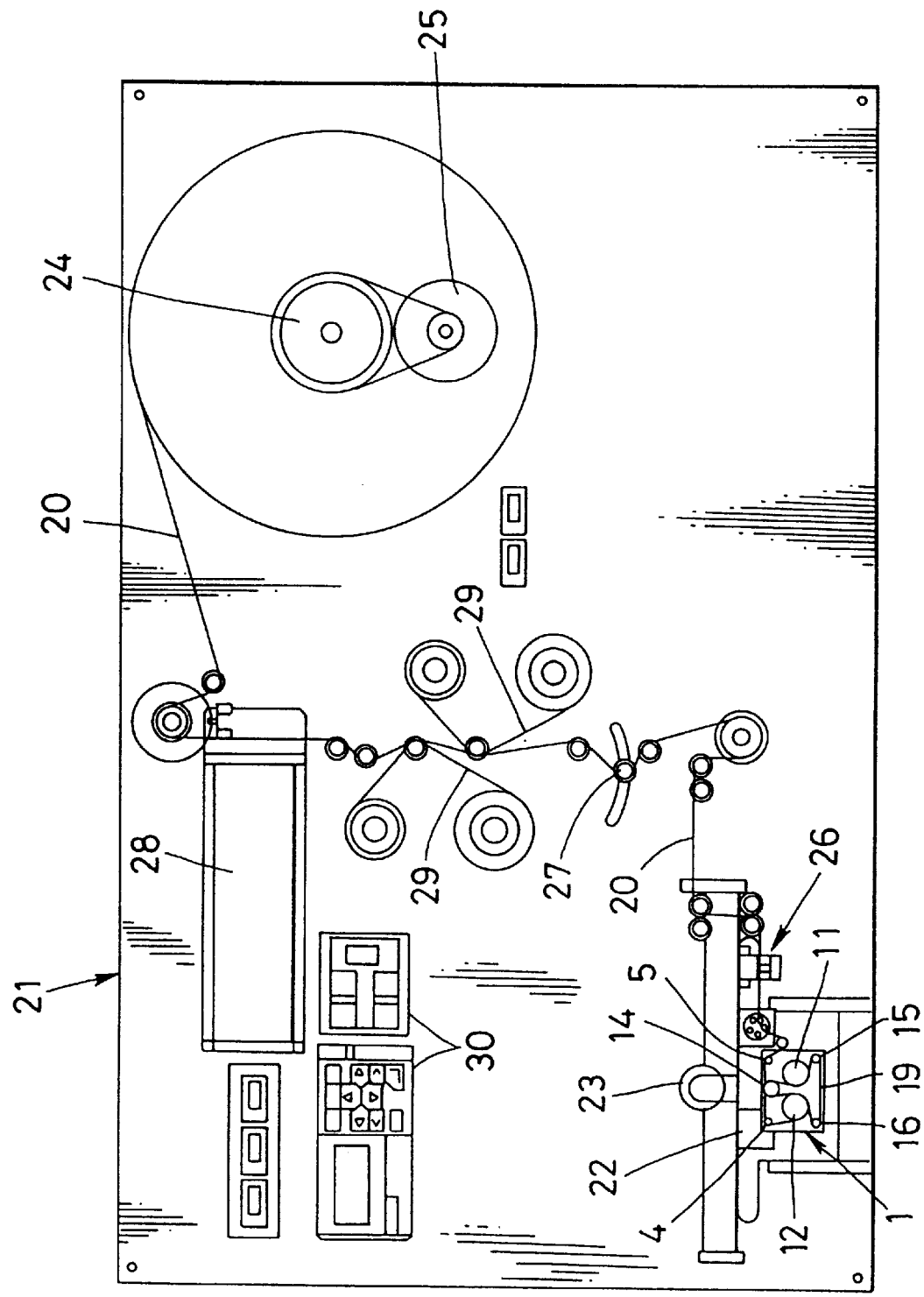
FIG. 5 is a plan view showing a tape-winding step.

In the tape-winding step as described above, as illustrated in FIG. 5, a magnetic tape 20 is wound on the first and second tape reels 11 and 12 by using a tape winder 21.

The tape winder 21 is used for winding the magnetic tape 20 on the tape reels 11 and 12 without forming a marking hole in the magnetic tape.

Specifically, the tape winder 21 includes a base plate mount section 22 on which the base plate 1 with the drive belt 19 placed on the first to third belt guide rollers 14 to 16 is mounted after the shafts forming step, the assembly step, and the drive-belt disposing step described above. The tape winder 21 includes a drive capstan roller 23 which is so arranged as to be opposed to the base plate mount section 22 and contacted with the first belt guide roller 14 to thereby rotate the first belt guide roller 14. The tape winder 21 also includes a roll 24 provided for supplying the magnetic tape 20 to the first and second tape reels 11 and 12 on the base plate 1, and a motor 25 for rotating the roll 24.

First, the base plate 1 with the drive belt 19 placed on the first to third belt guide rollers 14 to 16 is mounted on the base plate mount section 22. A leading end of the magnetic tape 20 drawn from the roll 24 is transported and interposed between the second tape reel 12 and the drive belt 19 in contact relation thereto and engaged by the second tape reel 12. Then, the drive capstan roller 23 is driven to rotate the first belt guide roller 14, whereby the drive belt 19 starts to be transported. The transportation of the drive belt 19 causes the first and second tape reels 11 and 12 to rotate, whereby the magnetic tape 20 is wound on the second tape reel 12.

When the magnetic tape 20 is taken up on the second tape reel 12 by a predetermined amount, the magnetic tape 20 is cut by a cutter 26. A terminal end of the magnetic tape 20 cut is transported along the first and second tape guides 4 and 5 and interposed between the first tape reel 12 and the drive belt 19 in contact relation to be engaged by the first tape reel 12. The first tape reel 11 having the terminal end is rotated in a reverse direction until a predetermined amount of the magnetic tape 20 is taken up on the first tape reel. Thus, the magnetic tape 20 is wound on the first and second tape reels 11 and 12.

Upon winding the magnetic tape 20 on the second tape reel 12, the magnetic tape 20 is subject to application of tensile load which is controlled by means of a tension roller 27 and a vacuum chamber 28.

The vacuum chamber 28 alleviates the tensile load applied to the magnetic tape 20 when the leading end of the magnetic tape 20 is engaged by the second tape reel 12, serving for easy engagement of the leading end of the magnetic tape 20 with the second tape reel 12.

Reference numerals 29 and 30 denote a cleaning tape for the magnetic tape 20 and a controller, respectively.

Figure 6:
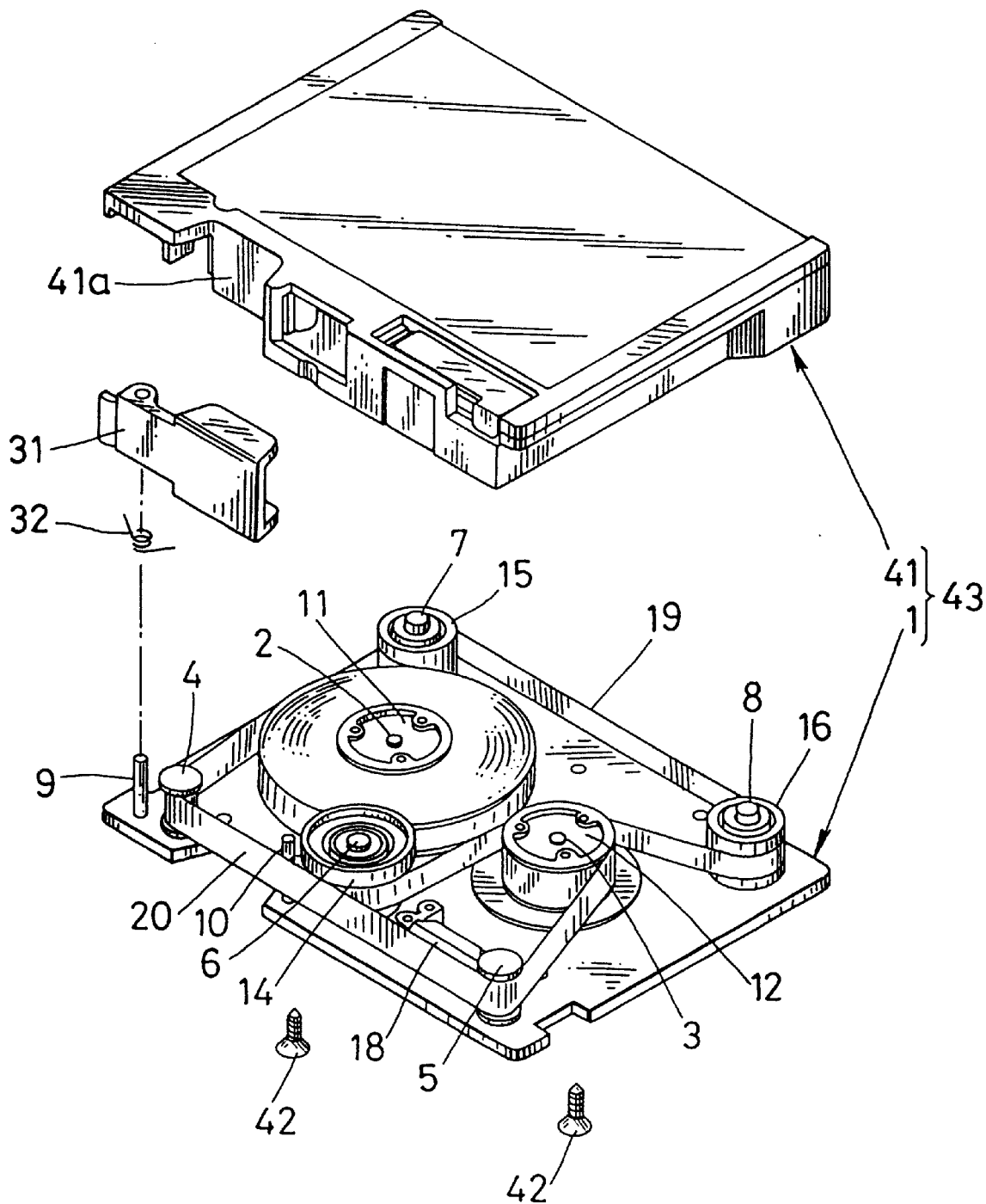
FIG. 6 is a perspective view showing a cover-securing step.

In the cover-securing step as described above, as illustrated in FIG. 6, a lid 31 and a spring 32 are mounted on the lid support shaft 9 formed on the base plate 1, and then a cover 41 is secured to the base plate 1 by means of screws 42, 42 and the like.

Thus, the tape cartridge 43 is completely assembled by securing the cover 41 to the base plate 1 by means of the screws 42, 42 and the like.

In the marking hole forming step as described above, as illustrated in FIG. 7, the marking hole is formed in the magnetic tape 20 wound on the first and second tape reels 11 and 12 by using an apparatus 51 for forming the marking hole as explained later.

In the above-described method of manufacturing the magnetic tape cartridge, according to the present invention, the step of winding the magnetic tape 20 on the first and second tape reels 11 and 12 and the step of forming the marking hole in the magnetic tape 20 are performed separately and individually, and the marking hole forming step is carried out after the cover-securing step.

Accordingly, the cartridge having the magnetic tape 20 with no marking hole can be stored and then the formation of the marking hole in the magnetic tape can be performed according to the applications or purposes. Thus, the method of the invention eliminates a need of preliminarily classifying the tape cartridges on the basis of the different marking holes in the magnetic tapes, thereby facilitating a stock control thereof.

Further, since the winding of the magnetic tape and the formation of the marking hole is performed at the separate steps, a time required for manufacturing the tape cartridge can be reduced.

The apparatus 51 for forming the marking hole will now be explained.

Figure 8:
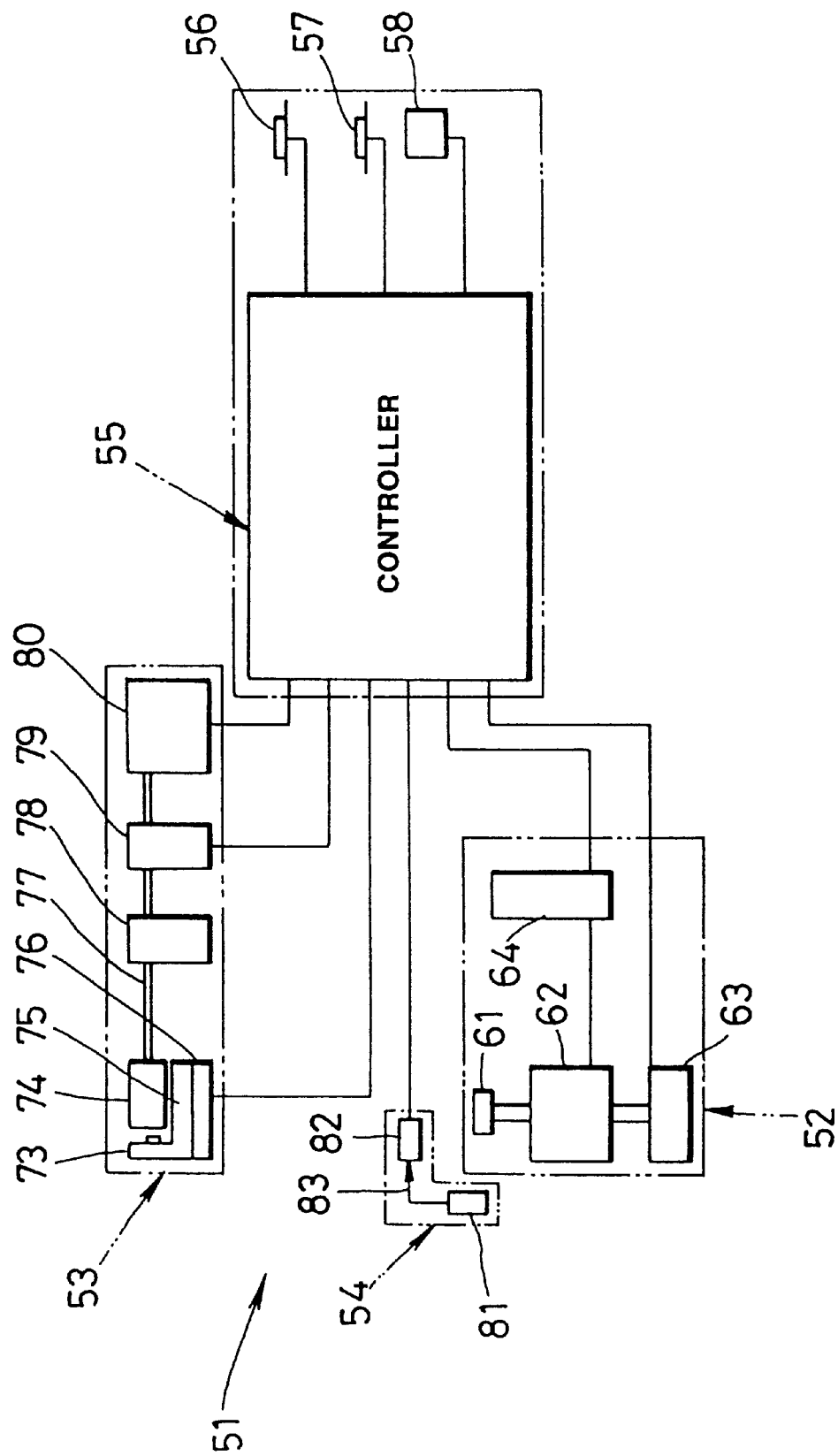
FIG. 8 is a block diagram showing an apparatus of forming a marking hole.

FIG. 8 is a block diagram of the marking hole forming apparatus 51.

The marking hole forming apparatus 51 includes a tape driving section 52 for transporting the magnetic tape 20 wound on the tape reels of the tape cartridge. A punching section 53 is disposed at a predetermined position, viz. within a head-inserting portion 41a provided on the cover 41 to form a marking hole in the magnetic tape 20 transported by a predetermined amount by the tape driving section 52.

A hole-position detecting section 54 is so disposed as to detect a position of the marking hole formed by the punching section 53. A controller 55 is provided to control the tape driving section 52, the punching section 53, and the hole-position detecting section 54.

Reference numerals 56, 57, and 58 denote a start switch, a stop switch, and a pattern set switch of the controller 55, respectively.

The tape driving section 52 includes a drive capstan roller 61 for driving the first belt guide roller 14, a pulse motor 62 for rotatively driving the drive capstan roller 61, an encoder 63 for detecting the number of revolutions of the pulse motor 62, and a driver 64 for the pulse motor 62.

When the tape cartridge 1 is inserted into a cartridge-receiving portion (not shown) of the marking hole forming apparatus 51, the first belt guide roller 14 is located so as to be allowed to come into contact with the drive capstan roller 61.

Figure 9:
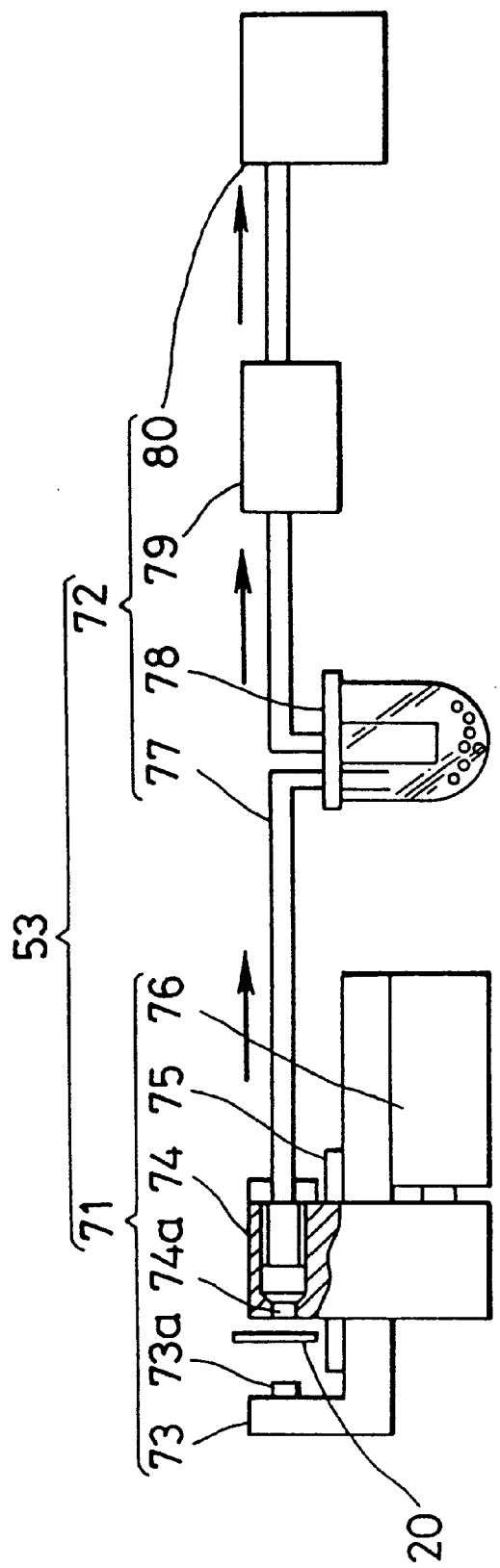
FIG. 9 is a side view of a punching means.

As illustrated in FIG. 9, the punching section 53 includes a puncher 71 for forming a marking hole in the magnetic tape 20, and a scrap collector 72 for collecting scraps from the magnetic tape 20 which are generated due to the formation of the marking hole by the puncher 71.

The puncher 71 includes a punch holder 73 having a punch 73a projecting outwardly from the punch holder 73, a stationary die 74 having a recessed or notched portion 74a engageable with the punch 73a, and a guide 75 and a solenoid 76 which are so constructed and arranged as to move the punch holder 73 toward the stationary die 74.

Figure 7:
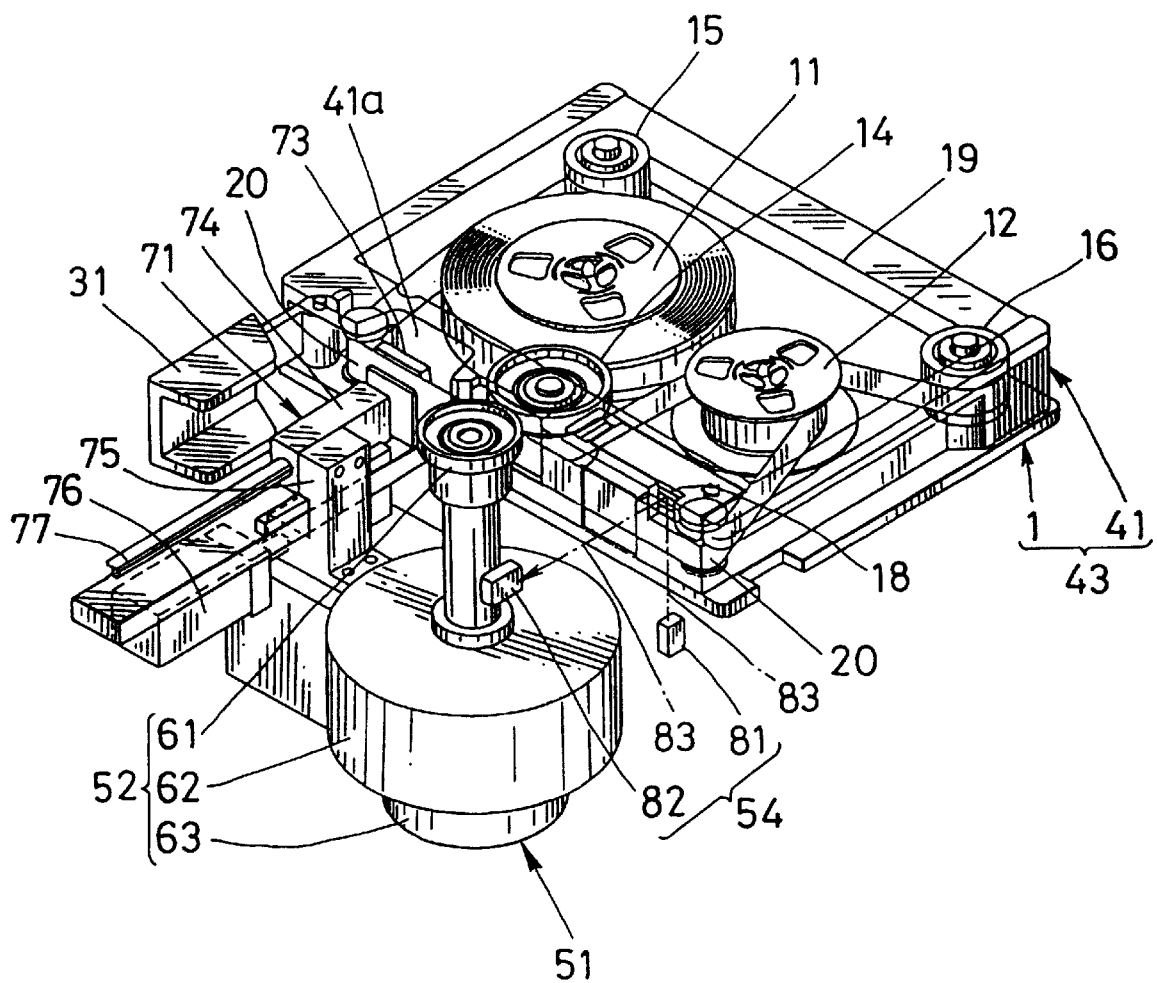
FIG. 7 is a schematic perspective view showing a marking hole forming step.

The scrap collector 72 includes an air passage 77 communicating with the recessed portion 74a of the stationary die 74, a filter 78 disposed in the air passage 77, a solenoid-operated valve 79 acting for closing and opening the air passage 77, and As shown in FIG. 7, when the tape cartridge 43 is placed in the cartridge-receiving portion of the marking hole forming apparatus 51, the punch holder 73 of the puncher 71 is located in the head-inserting portion 41a of the tape cartridge 43 such that the magnetic tape 20 is interposed between the punch holder 73 of the puncher 71 and the stationary die 74.

Subsequently, when the punch holder 73 is moved toward the stationary die 74, the marking hole is formed in the magnetic tape 20.

The hole-position detecting section 54 includes a photosensor composed of a light emitting source 81 and a light receiving member 82.

The light emitting source 81 is disposed in a downwardly spaced relation to the mirror 18 of the tape cartridge 43 inserted into the cartridge-receiving portion of the marking hole forming apparatus. The light receiving member 82 is arranged in a forwardly spaced relation to the mirror 18.

A detection light 83 emitted from the light emitting source 81 is reflected by the mirror 18 and reaches the magnetic tape 20. In a case where the marking hole is not formed in a portion of the magnetic tape which is exposed to the detection light reflected, the detection light 83 reflected is shut off by the magnetic tape to be prevented from incidence on the light receiving member 82. If the portion of the magnetic tape 20 has the marking hole, the detection light 83 reflected is transmitted through the marking hole to the light receiving member 82.

Figure 10:
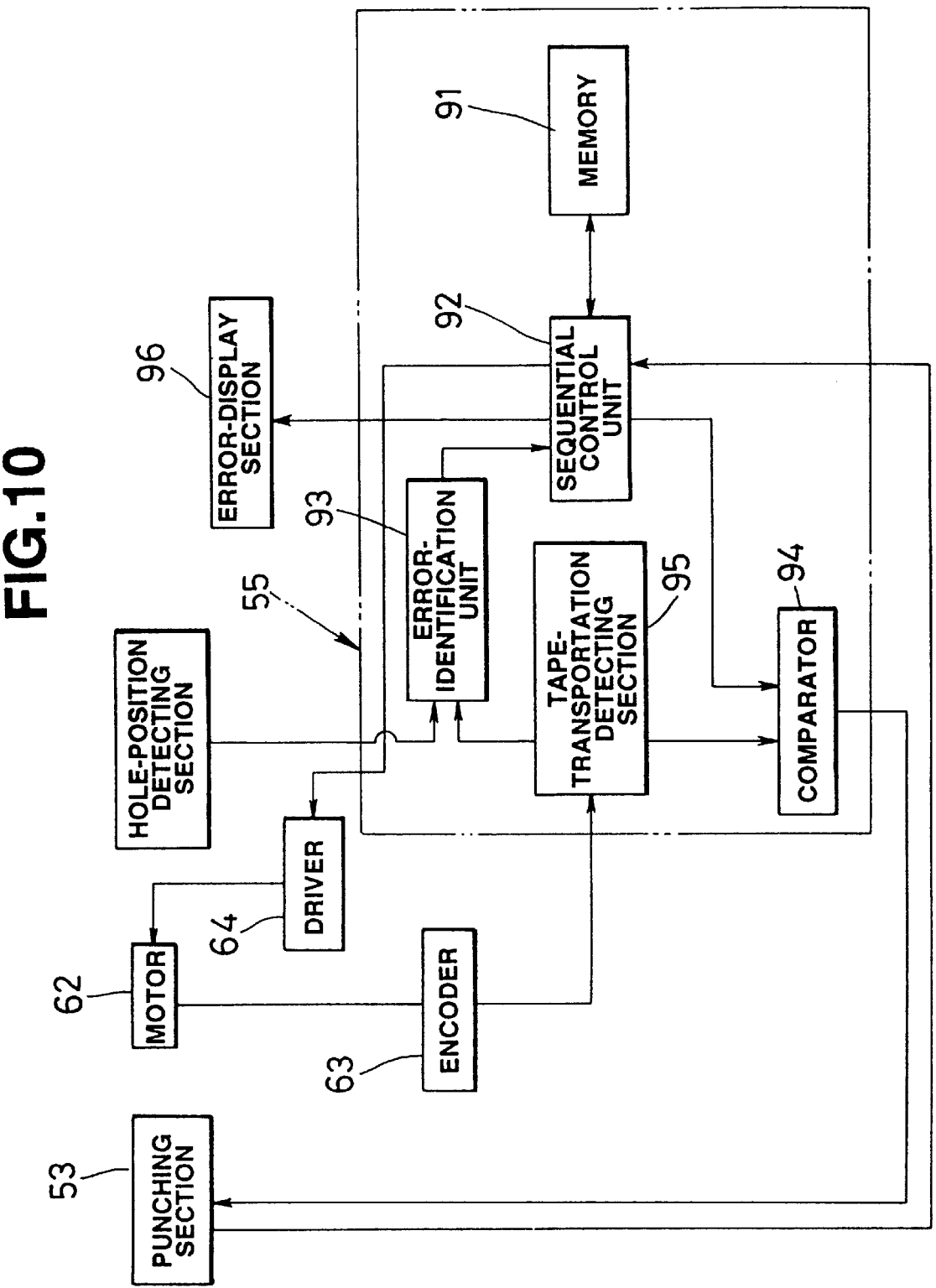
FIG. 10 is a block diagram of a controller.

The controller 55 will be explained hereinafter by using a block diagram shown in FIG. 10. The controller 55 includes a tape-transportation detecting unit 95 for detecting an amount of transportation of the magnetic tape on the basis of an output from the encoder 63. An error-identification unit 93 is provided for identifying an error relative to the hole formation on the basis of an output from the hole-position detecting section 54 and results of the detection by a tape-transportation detecting section 95. A sequential control unit 92 is provided for controlling a whole operation of the controller 55 on the basis of data such as punching data, speed data, and the like, which are stored in a memory 91. A comparator 94 is provided for controlling the punching section 53 by comparing an output from the tape-transportation detecting section 95 with the punching data transmitted from the sequential control unit 92. When receiving error-indicative outputs from the error-identification unit 93, the sequential control unit 92 controls an error-display section 96 so as to inform an operator of an occurrence of the error.

Figures 11, 12:
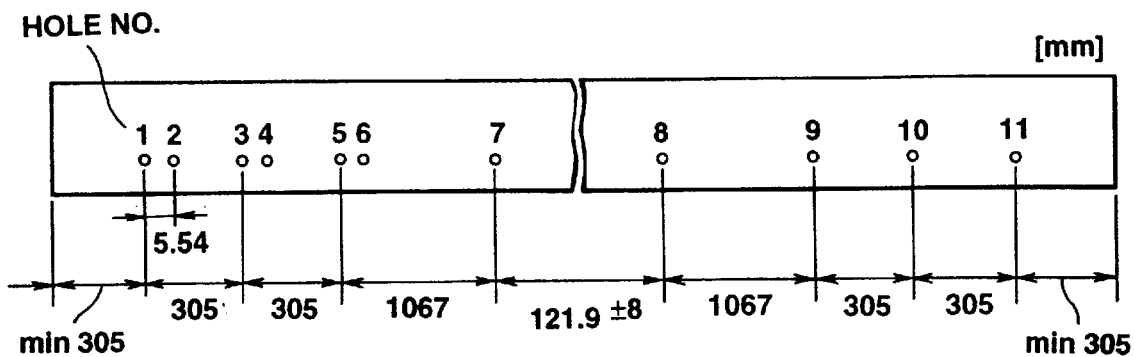
FIG. 11 is a diagram showing one example of a pattern of hole position.
FIG. 12 is a diagram showing one example of a speed pattern for transportation of the magnetic tape between the holes.

FIG. 11 shows one example of a pattern of a marking hole, in which the marking holes denoted by hole numbers 1 to 11 are spaced at a predetermined distance apart from each other.

FIG. 12 shows one example of a speed pattern of transportation of the magnetic tape between two holes. The speed of transportation of the magnetic tape between hole No. 7 and hole No. 8 is high, viz. 3.10 m/s, and the speed of transportation of the magnetic tape between the two holes of the remainder is low, viz. 0.05 m/s.

Accordingly, in a case where a distance between the adjacent two holes is great, the speed of transportation of the magnetic tape is set high such that an operating efficiency at the marking hole forming step can be increased.

An operation of the marking hole forming apparatus 51 is explained as follows.

Data relative to the marking hole and the speed pattern for transportation of the magnetic tape between the adjacent two holes are entered into the memory 91 by operating the pattern set switch 58.

Next, the tape cartridge 43 is inserted into the cartridge-receiving portion of the marking hole forming apparatus 51 in an automatic or manual manner.

When the tape cartridge 43 is inserted, the lid 31 is automatically moved to its open position as shown in FIG. 7. In this condition, the drive capstan roller 61 of the marking hole forming apparatus 51 is urged to be pressingly contacted with the first belt guide roller 14 of the tape cartridge 43. At the same time, the punch holder 73 of the puncher 71 moves into the head-inserting portion 41a of the tape cartridge 43 so that the magnetic tape 20 is interposed between the punch holder 73 and the stationary die 74.

When the start switch 56 is turned on in such a condition that a cartridge-in sensor detects the insertion of the tape cartridge 43, the motor 62 is actuated and then driven according to the pattern of the marking hole and the speed pattern for transportation of the magnetic tape between the holes, which are input in the memory 91.

Figure 13B:
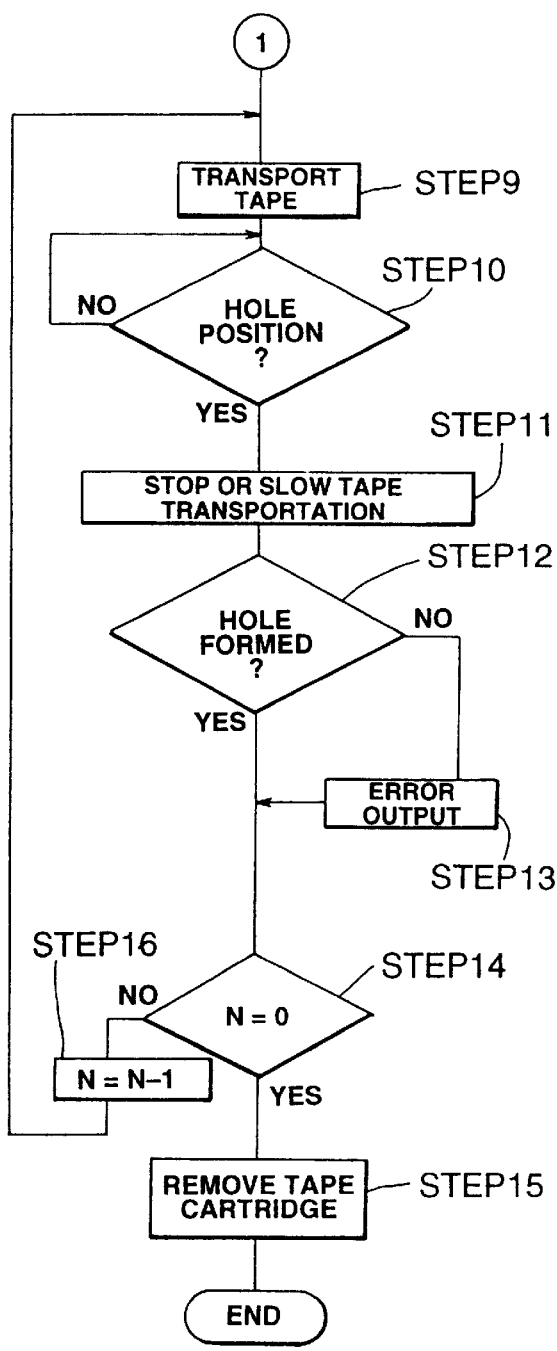
FIGS. 13A and 13B are flow charts of an operation of the apparatus.
Figure 13A:
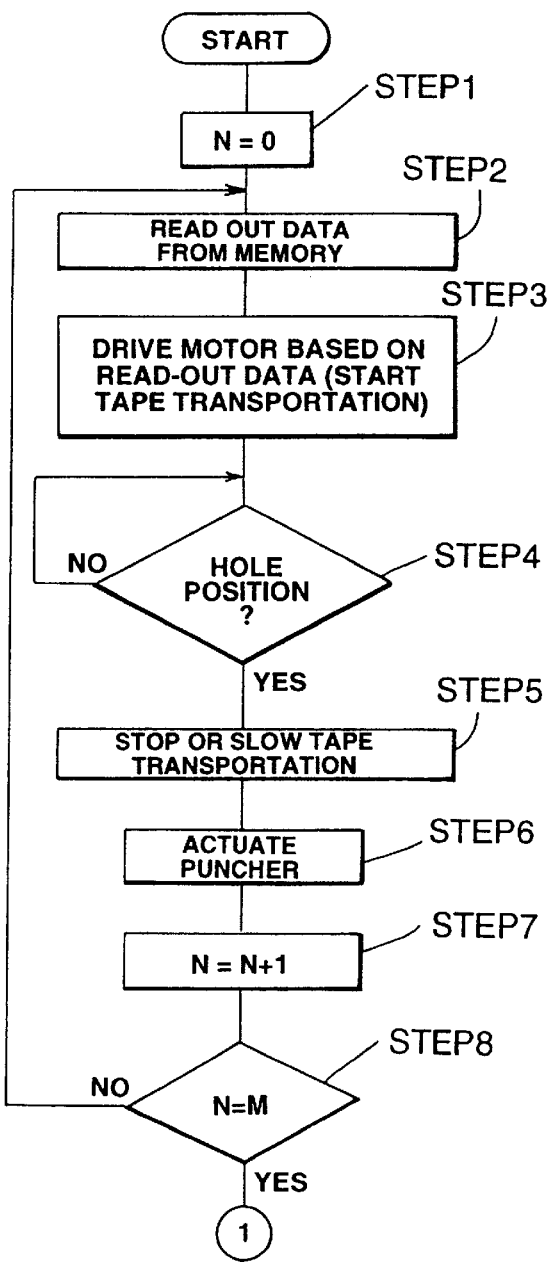

Next, a manner of the operation of the marking hole forming apparatus 51 is now explained by referring to a flow chart shown in FIG. 13. This flow chart indicates respective steps carried out by the elements of the controller 55 as shown in FIG. 10.

First, the operation of the marking hole forming apparatus 51 starts by turning on the start switch 56. At a step 1, a variable N is set to 0 (zero). At a step 2, data including the punching data and the like are read out from the memory. The routine proceeds to a step 3, at which, based on the read-out data, the driver starts The routine proceeds to a step 4. At the step 4, the magnetic tape 7 is transported until an output from the encoder 63 is consistent with the variable N representing a marking hole position which is obtained from the read-out punching data. If the interrogation at the step 4 results in affirmative, the routine proceeds to a step 5. At the step 5, the driver 64 is controlled such that the transportation of the magnetic tape 20 is stopped or the speed of the transportation thereof is reduced. The routine proceeds to a step 6 at which a marking hole is formed in the magnetic tape 20 by controlling the punching section 53. At a step 7, the variable N is set to a new value of the previously set variable N plus one. The routine proceeds to a step 8 at which there is an interrogation whether or not the variable N of the new value is equal to M which represents the total number of marking holes to be formed in the magnetic tape 20. If the interrogation at the step 8 results in negative, the routine return to the step 2 and then the subsequent processings mentioned above are repeatedly performed. If the interrogation at the step 8 results in affirmative, the routine proceeds to a step 9. At the step 9, the rotation of the magnetic tape 20 in the reverse direction is started by controlling the driver 64. At a step 10, there is an interrogation whether the magnetic tape is transported to the hole position represented by the variable N. The processing performed at the step 10 is similar to the processing at the step 4. If the interrogation at the step 10 results in affirmative, the routine proceeds to a step 11. At the step 11, by controlling the driver 64, the transportation of the magnetic tape 20 is stopped or the transportation speed thereof is reduced. The routine proceeds to a step 12 at which there is an interrogation whether the marking hole is formed on the basis of detection results by the hole-position detecting section 54. If it is not detected that the marking hole is formed, it is identified that an error occurs upon forming the marking hole and the routine proceeds to a step 13. At the step 13, the error-display section 96 displays an error message indicative of the occurrence of the error caused upon the formation of the marking hole. The routine proceeds to a step 14. If it is detected that the marking hole is formed, the routine jumps to the step 14. There is an interrogation at the step 14 whether or not the variable N is zero. If it is not detected that the variable N is zero, the routine proceeds to a step 16 at which the variable N is reduced by subtracting one therefrom. And then the routine returns to the step 9. On the other hand, if it is detected that the variable N is zero, the routine proceeds to a step 15 at which the tape cartridge 1 is removed. Thus, the routine ends.

The marking hole forming apparatus 51 of this embodiment has the structure as described above, in which, after securing the cover to the base plate and assembling the tape cartridge, the magnetic tape is transported by the tape driving section and at the same time the marking hole is readily formed in the magnetic tape by the punching section. This serves for increasing an operating efficiency as compared with a conventional method in which the magnetic tape is wound on the tape reels while being formed with the marking hole.

Further, the marking hole forming apparatus of the embodiment is capable of forming the marking hole while transporting the magnetic tape, and detecting the position of the marking hole while transporting the magnetic tape in a reverse direction. Thus, by utilizing this reciprocal transportation of the magnetic tape, the formation of the marking hole and the detection of the hole position are effectively performed.

Figure 14:
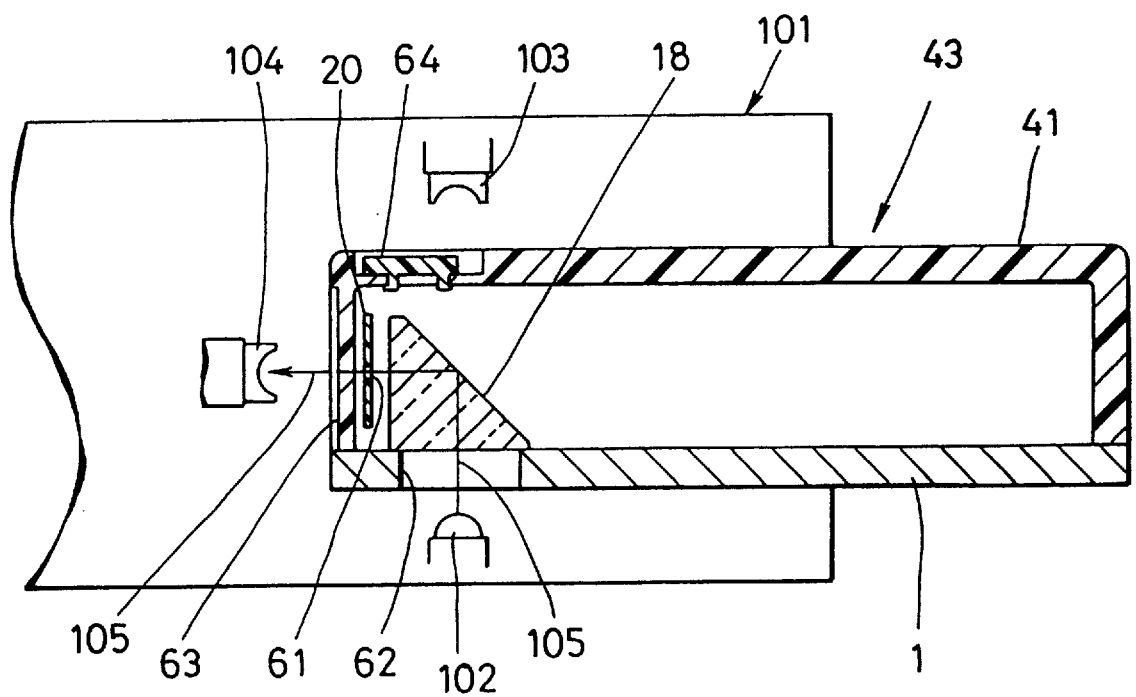
FIG. 14 is a sectional view illustrating a tape cartridge inserted into a drive device.

As illustrated in FIG. 14, the tape cartridge 43 having the magnetic tape formed with the marking hole as described above, is loaded to the drive device 101 upon use thereof.

The drive device 101 includes a light emitting source 102, a first light receiving member 103 (cartridge-in sensor), and a second light receiving member 104 (tape-position sensor).

When the tape cartridge 43 is loaded to the drive device 101, the detection light 105 emitted from the light emitting source 102 is reflected on the mirror 18 and prevented from reaching the first light receiving member 103. By this, it is detected that the tape cartridge 43 is loaded to the drive device 101.

The detection light 105 reflected on the mirror 18 is directed to the magnetic tape 20 and the second light receiving member 104.

On the other hand, when the tape cartridge 43 is loaded to the drive device 101, the drive capstan roller (not shown) arranged in the drive device 101 is contacted with the first belt guide roller 14.

When the drive capstan roller rotates, the first belt guide roller 14 is driven to move the drive belt 19 through which the magnetic tape 20 is transported.

As the magnetic tape 20 is transported, the marking hole 61 formed in the magnetic tape 20 moves to in a light path of the detection light 105 reflected on the mirror 18. In this condition, the detection light 105 is transmitted through the marking hole 61 to thereby reach the second light receiving member 104. In such a manner, leading and trailing ends of the magnetic tape 20 wound can be detected.

Provided on the base plate 1 is a detection-light passing portion 62 serving for introducing the detection light 105 from the light emitting source 102 of the drive device 101 into the inside of the tape cartridge 43. Further, disposed on the cover 41 is a reflected detection light passing portion 63 through which the detection light 105 reflected on the mirror 18 is transmitted to the second light receiving member 104. The cover 41 is also provided with an erroneous deletion-preventing portion 64.

Figure 15:
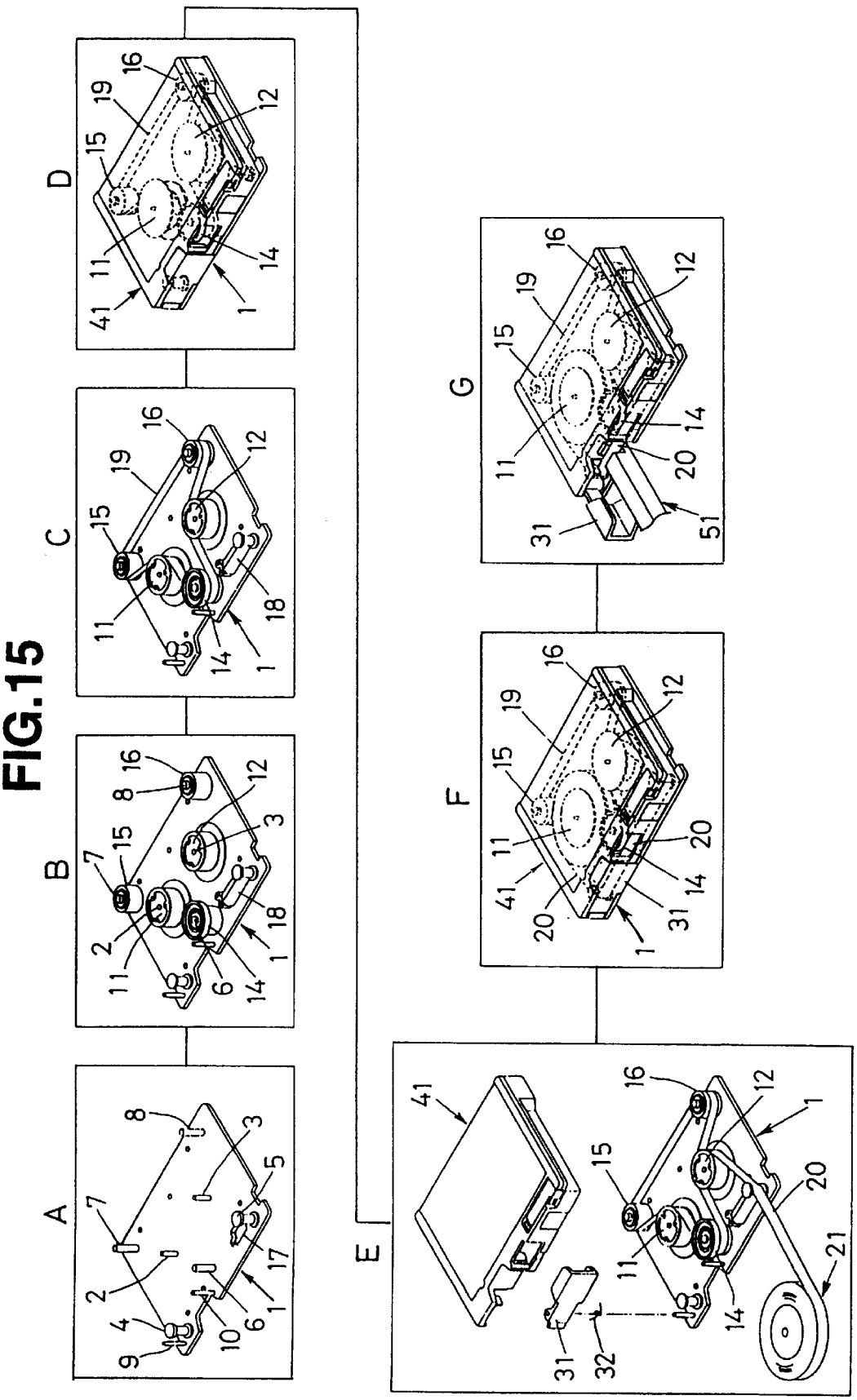
FIG. 15 is a block diagram illustrating another embodiment of the method of manufacturing a tape cartridge.

FIG. 15 shows a second embodiment of the method of manufacturing a tape cartridge, according to the present invention.

The method includes the steps of: shafts forming step A (first step) of forming first and second reel shafts 2 and 3, first and second tape guides 4 and 5, first, second, and third roller shafts 6, 7, and 8, a lid support shaft 9, and a tape guide pin 10 on a base plate 1; assembly step B (second step) of mounting first and second tape reels 11 and 12 on the first and second reel shafts 2 and 3, respectively, first, second, and third belt guide rollers 14, 15, and 16 on the first, second, and third roller shafts 6, 7, and 8, respectively, and a mirror 18 on the base plate 1; drive belt mounting step C (third step) of disposing a drive belt 19 on the first, second, and third belt guide rollers 14, 15, and 16; first cover securing step D (fourth step) of securing a cover 41 to the base plate 1 to form an empty tape cartridge having the tape reels 11 and 12 on which a magnetic tape 20 is not wound; tape-winding step E (fifth step) of winding the magnetic tape 20 on the tape reels of the empty tape cartridge; second cover securing step F (sixth step) of securing the cover 41 to the base plate again after winding the magnetic tape; and marking hole forming step G (seventh step) of forming a marking hole in the magnetic tape 20 wound on the tape reels 11 and 12.

An essential difference between the manufacturing method of the second embodiment and the manufacturing method of the first embodiment described above resides in that the manufacturing method of the second embodiment comprises the step of securing the cover 41 to the base plate 1 before winding the magnetic tape 20 on the tape reels 11 and 12 to thereby form the empty tape cartridge without accommodating the magnetic tape 20 therein.

At the above tape-winding step, a tape winder similar to the tape winder 21 mentioned in the first embodiment, is employed.

Further, at the step of forming the marking hole, a marking hole forming apparatus similar to the marking hole forming apparatus .51 explained in the first embodiment is employed.

According to the method of the second embodiment as explained above, an incomplete magnetic tape cartridge itself, which is the empty tape cartridge having no magnetic tape, can be also marketed as a commercial product. In addition, it is possible to provide a complete tape cartridge to be marketed, by using the empty tape cartridge purchased from cartridge shell makers. Namely, the empty tape cartridge can be subject to the winding of the magnetic tape or the formation of the marking hole in the magnetic tape subsequent to the tape winding.

We claim:

1. A method of manufacturing a tape cassette which transportably accommodates a magnetic tape with a marking hole for positional identification formed therein, said method comprising the steps of:

forming a plurality of tape guides, a pair of reel shafts, a pair of corner-roller shafts, and a drive-roller shaft on a base plate;

rotatably mounting a pair of reels on said pair of reel shafts, respectively, a pair of corner rollers on said pair of corner-roller shafts, respectively, and a drive roller on said drive-roller shaft;

mounting a drive belt having an inner side and an outer side to said pair of corner-rollers and said drive roller so that said pair of corner rollers and said drive roller are positioned against said inner side of said drive belt and said pair of reels are positioned against said outer side of said drive belt, whereby said pair of corner-rollers and said pair of reels rotate when said drive roller rotates;

providing a magnetic tape devoid of any marking holes interposing a first end of said magnetic tape between one of said pair of reels and said drive belt with a length of said magnetic tape positioned along said plurality of tape guides; then rotating said drive roller in a first direction, thereby rotating said corner rollers and said pair of reels by causing transportation of said drive belt along, around and in contact with said corner rollers, said pair of reels and said drive roller, and thereby causing said magnetic tape to be wound onto said one of said pair of reels while said magnetic tape is guided by said plurality of tape guides; then stopping rotation of said drive roller, thereby stopping rotation of said corner rollers and said pair of reels by stopping transportation of said drive belt; then interposing a second end of said magnetic tape between the other of said pair of reels and said drive belt with a length of said magnetic tape positioned along said plurality of tape guides; then rotating said drive roller in a second direction opposite to said first direction, thereby rotating said corner rollers and said pair of reels by causing transportation of said drive belt along, around and in contact with said corner rollers, said other of said pair of reels, said magnetic tare wound on said one of said pair of reels, and said drive roller, and thereby causing some of said magnetic tape to be unwound from said one of said pair of reels and wound onto said other of said pair of reels while said magnetic tape is guided by said plurality of tape guides; then stopping rotation of said drive roller, thereby stopping rotation of said corner rollers and said pair of reels by stopping transportation of said drive belt; then securing a cover to said base plate, thereby enclosing said pair of reels having said magnetic tape devoid of any marking holes wound thereon, and thereby forming an assembled tape cassette;

positioning said assembled tape cassette relative to a marking hole forming apparatus;

transporting said magnetic tape by a predetermined amount at a predetermined speed by driving said drive rollers, so as to arrive at a predetermined location on said tape;

slowing said driven magnetic tape as said tape approaches said predetermined location on said tape;

forming a marking hole in said magnetic tape at said predetermined location through a head-inserting portion of said assembled tape cassette formed on a front side face of said cover by piercing said tape with a punch of said marking hole forming apparatus, said marking hole being aligned at a predetermined position along a width of said magnetic tape; and detecting whether an error occurred in said step of forming said marking hole.

2. A method of manufacturing a tape cassette which transportably accommodates a magnetic tape with a marking hole for positional identification formed therein, said method comprising the steps of:

forming a plurality of tape guides, a pair of reel shafts, a pair of corner-roller shafts, and a drive-roller shaft on a base plate;

rotatably mounting a pair of reels on said pair of reel shafts, respectively, a pair of corner rollers on said pair of corner-roller shafts, respectively, and a drive roller on said drive-roller shaft;

mounting a drive belt having an inner side and an outer side to said pair of corner rollers and said drive roller so that said pair of corner rollers and said drive roller are positioned against said inner side of said drive belt and said pair of reels are positioned against said outer side of said drive belt, whereby said pair of corner-rollers and said pair of reels rotate when said drive roller rotates;

securing a cover to said base plate, thereby enclosing said pair of reels, and thereby forming a tape cassette housing;

forming an assembled tape cassette by providing a magnetic tape devoid of marking holes;

interposing a first end of said magnetic tape between one of said pair of reels and said drive belt, with a length of said magnetic tape positioned along said plurality of tape guides; then rotating said drive roller in a first direction, thereby rotating said corner rollers and said pair of reels by causing transportation of said drive belt along, around and in contact with said corner rollers, said pair of reels and said drive roller, and thereby causing said magnetic tape to be wound onto said one of said pair of reels while said magnetic tape is guided by said plurality of tape guides; then stopping rotation of said drive roller, thereby stopping rotation of said corner rollers and said pair of reels by stopping transportation of said drive belt; then interposing a second end of said magnetic tape between the other of said pair of reels and said drive belt with a length of said magnetic tape positioned along said plurality of tape guides; then rotating said drive roller in a second direction opposite to said first direction, thereby rotating said corner rollers and said pair of reels by causing transportation of said drive belt along, around and in contact with said corner rollers, said other of said pair of reels, said magnetic tape wound on said one of said pair of reels, and said drive roller, and thereby causing some of said magnetic tape to be unwound from said one of said pair of reels and wound onto said other of said pair of reels while said magnetic tape is guided by said plurality of tape guides; then stopping rotation of said drive roller, thereby stopping rotation of said corner rollers and said pair of reels by stopping transportation of said drive belt; then positioning said assembled tape cassette relative to a marking hole forming apparatus;

transporting said magnetic tape wound on said pair of reels by a predetermined amount at a predetermined speed by driving said drive roller, so as to arrive at a predetermined location on said tape;

slowing said magnetic tape as said tape approaches said predetermined location on said tape;

forming a marking hole in said magnetic tape at said predetermined location through a head-inserting portion of said assembled tape cassette formed on a front side face of said cover by piercing said tape with a punch of said marking hole forming apparatus, said marking hole being aligned at a predetermined position along a width of said magnetic tape; and detecting whether an error occurred in said step of forming said marking hole.

3. A method of manufacturing a tape cassette which transportably accommodates a magnetic tape with a marking hole for positional identification formed therein, said method comprising the steps of:

forming a plurality of tape guides and a plurality of shafts on a base plate;

rotatably mounting a pair of reels and a plurality of belt guide rollers on said plurality of shafts, respectively;

disposing a drive belt on said pair of reels and said plurality of belt guide rollers such that said pair of reels and said plurality of belt guide rollers are simultaneously rotatably driven by said drive belt;

providing a magnetic tape devoid of an marking holes;

interposing a first end of said magnetic tape between one of said pair of reels and said drive belt with a length of said magnetic tape positioned along said plurality of tape guides; then rotating said drive roller in a first direction, thereby rotating said corner rollers and said pair of reels by causing transportation of said drive belt along, around and in contact with said corner rollers, said pair of reels and said drive roller, and thereby causing said magnetic tape to be wound onto said one of said pair of reels while said magnetic tape is guided by said plurality of tape guides; then stopping rotation of said drive roller, thereby stopping rotation of said corner rollers and said pair of reels by stopping transportation of said drive belt; then interposing a second end of said magnetic tape between the other of said pair of reels and said drive belt with a length of said magnetic tape positioned along said plurality of tape guides; then rotating said drive roller in a second direction opposite to said first direction, thereby rotating said corner rollers and said pair of reels by causing transportation of said drive belt along, around and in contact with said corner rollers, said other of said pair of reels, said magnetic tape wound onto said one of said pair of reels, and said drive roller, and thereby causing some of said magnetic tape to be unwound from said one of said pair of reels and wound onto said other of said pair of reels while said magnetic tape is guided by said plurality of tape guides; then stopping rotation of said drive roller, thereby stopping rotation of said corner rollers and said pair of reels by stopping transportation of said drive belt; then securing a cover to said base plate, thereby enclosing said pair of reels having said magnetic tape devoid of any marking-holes wound thereon, and thereby forming an assembled tape cassette;

mounting to said base plate a movable lid for opening and closing a head-inserting portion of said cover;

positioning said assembled tape cassette relative to a marking hole forming apparatus;

transporting said magnetic tape in a predetermined direction at a predetermined speed by driving said drive belt, so as to arrive at a predetermined location on said tape;

slowing said magnetic tape as said tape approaches said predetermined location on said tape;

forming a marking hole in said magnetic tape at said predetermined location through said head-inserting portion of said assembled tape cassette by piercing said tape at said predetermined location with a punch of said marking hole forming apparatus, said marking hole being aligned at a predetermined position along a width of said magnetic tape; and detecting whether an error occurred in said step of forming said marking hole.

4. An apparatus for forming a marking hole in a magnetic tape of a pre-assembled tape cartridge, comprising:

a cartridge-mounting portion for receiving a pre-assembled tape cartridge housing a magnetic tape movably wound on a pair of reels, the tape cartridge having a head-insertion portion through which the magnetic tape is accessibly exposed;

tape driving means for transporting the magnetic tape within the tape cartridge;

marking hole forming means for forming a marking hole in a portion of the magnetic tape exposed through the head-insertion portion of the tape cartridge;

memory means for storing positional information indicative of the predetermined position at which the marking hole is to be formed on the magnetic tape; and control means for controlling the tape driving means and the marking hole forming means based on the positional information stored in the memory means, wherein the control means causes the tape driving means to transport the magnetic tape at a predetermined speed until the predetermined position is approached and then causes the marking hole forming means to form the marking hole at the predetermined position and the control means includes error detection means for detecting an error in the marking hole formed by the marking hole forming means.

5. The apparatus as set forth in claim 4, further comprising marking hole detection means for detecting whether the marking hole has been formed in the magnetic tape, and wherein the control means controls the tape driving means and the marking hole forming means based on the positional information to form the marking hole in the magnetic tape while transporting the magnetic tape in a first direction, and the control means determines whether the marking hole has been formed in the magnetic tape while transporting the magnetic tape in a second direction opposite to the first direction based on an output from the marking hole detection means.

6. The apparatus as set forth in claim 5, further comprising transportation amount detecting means for detecting an amount that the magnetic tape has been transported by the tape driving means, and wherein the control means controls the marking hole forming means such that the marking hole is formed in the magnetic tape based on detection results from the transportation amount detecting means and the positional information stored in the memory means.

7. The apparatus as set forth in claim 6, wherein the control means controls the tape driving means such that transportation of the magnetic tape is stopped by the tape driving means when the detection results of the transportation amount detecting means is equal to the positional information.

8. The apparatus as set forth in claim 4, further comprising transportation amount detecting means for detecting an amount that the magnetic tape has been transported by the tape driving means, and wherein the memory means stores speed information relating to a transport speed of the magnetic tape between marking holes, and the control means controls the tape driving means such that the magnetic tape is transported at a speed determined based on detection results of the transportation amount detecting means and the speed information.

* * * * *